US011428235B2

(12) United States Patent
Chen et al.

(10) Patent No.: US 11,428,235 B2
(45) Date of Patent: Aug. 30, 2022

(54) FAN MODULE AND MOTOR

(71) Applicant: Quanta Computer Inc., Taoyuan (TW)

(72) Inventors: Chao-Jung Chen, Taoyuan (TW);
Yu-Nien Huang, Taoyuan (TW)

(73) Assignee: QUANTA COMPUTER INC.,
Taoyuan (TW)

( * ) Notice: Subject to any disclaimer, the term of this patent is extended or adjusted under 35 U.S.C. 154(b) by 94 days.

(21) Appl. No.: 17/070,586

(22) Filed: Oct. 14, 2020

(65) Prior Publication Data
US 2021/0355953 A1 Nov. 18, 2021

Related U.S. Application Data

(60) Provisional application No. 63/025,674, filed on May 15, 2020.

(51) Int. Cl.
*F04D 29/056* (2006.01)
*F04D 19/00* (2006.01)
*F04D 25/06* (2006.01)

(52) U.S. Cl.
CPC ....... *F04D 29/0563* (2013.01); *F04D 19/002* (2013.01); *F04D 25/06* (2013.01); *F05D 2240/54* (2013.01)

(58) Field of Classification Search
CPC .... F04D 19/002; F04D 25/06; F04D 29/0563; F05D 2240/54
See application file for complete search history.

(56) References Cited

U.S. PATENT DOCUMENTS

| 4,336,470 | A | * | 6/1982 | Gutris | H02K 5/00 310/67 R |
| 4,638,201 | A | * | 1/1987 | Feigel | H02K 5/173 310/216.096 |
| 5,258,676 | A | * | 11/1993 | Reinhardt | H02K 7/14 310/67 R |
| 7,859,145 | B2 | * | 12/2010 | Rapp | F04D 25/062 310/90 |

(Continued)

FOREIGN PATENT DOCUMENTS

| CN | 101505073 A | 8/2009 |
| CN | 104421174 A | 3/2015 |

(Continued)

OTHER PUBLICATIONS

Extended European Search Report for EP Application No. 21163127.0 dated Sep. 8, 2021.

(Continued)

*Primary Examiner* — Patrick Hamo
(74) *Attorney, Agent, or Firm* — Nixon Peabody LLP

(57) ABSTRACT

Fan modules and motors are disclosed. The fan motor includes a bearing holder having a first bearing holder end and a second bearing holder end. The bearing holder has a first section with a first diameter that is smaller than diameters of the first bearing holder end and the second bearing holder end. The motor further includes a first bearing retained by the bearing holder at the first bearing holder end, and a second bearing retained by the bearing holder at the second bearing holder end. The motor further includes a shaft retained by the first bearing and the second bearing, and a stator surrounding the first section of the bearing holder.

11 Claims, 5 Drawing Sheets

(56) References Cited

U.S. PATENT DOCUMENTS

| | | | | |
|---|---|---|---|---|
| 8,113,781 | B2* | 2/2012 | Chang | F16C 19/54 |
| | | | | 416/174 |
| 10,673,302 | B2* | 6/2020 | Horng | H02K 21/22 |
| 2009/0052820 | A1* | 2/2009 | Chang | F16C 19/54 |
| | | | | 384/249 |
| 2018/0091020 | A1 | 3/2018 | Horng et al. | |

FOREIGN PATENT DOCUMENTS

| | | |
|---|---|---|
| JP | 62010444 U | 1/1987 |
| JP | 2001082387 A | 3/2001 |
| JP | 2015094228 A | 5/2015 |
| JP | 2019218938 A | 12/2019 |
| TW | M291028 U | 5/2006 |
| TW | M310584 U | 4/2007 |
| TW | 201516266 A | 5/2015 |

OTHER PUBLICATIONS

TW Office Action for Application No. 110107212, dated May 26, 2022, w/ First Office Action Summary.

TW Search Report for Application No. 110107212, dated May 26, 2022, w/ First Office Action.

JP Office Action for Application No. 2021-066606, dated Mar. 22, 2022, w/ First Office Action Summary.

\* cited by examiner

FAN MODULE AND MOTOR

CROSS-REFERENCE TO RELATED APPLICATION

This application claims priority under 35 U.S.C. § 119 to U.S. Provisional Application No. 63/025,674, titled "COMPACT MOTOR DESIGN FOR HIGH EFFICIENT AXIAL/AXIAL COMPRESSOR FAN," and filed on May 15, 2020. The contents of that application are hereby incorporated by reference in their entirety.

FIELD OF THE INVENTION

The present invention relates to fan modules and motors, such as fan modules and motors for cooling computer systems.

BACKGROUND

FIG. 1 is a perspective view depicting a conventional fan module 100 configured for cooling a computer system. The fan module 100 includes a frame 102. The fan module 100 further includes a fan 104 that rotates about an axis X of the frame 102. The fan 104 includes a plurality of blades 106 that extend radially from a hub 108. A length L1 of the fan module 100 corresponds to the diameter of the fan 104. A length L2 of the fan module 100 corresponds to the diameter of the hub 108 of the fan 104.

Conventional fan modules used for cooling computer systems traditionally have a ratio L2/L1 of about 0.6. This ratio is particularly true for conventional fan modules with a 40 mm diameter fan. For example, for a 40 mm diameter fan 104 (e.g., L1=40 mm), the hub 108 has a diameter of about 26 mm (e.g., L2=26 mm). This large ratio limits the efficiency of the fan module 100 because a large area is occupied by the hub 108.

Accordingly, there is a need for fan modules and motors for computer systems that have higher efficiencies. Aspects of the present disclosure solve this and other problems.

SUMMARY

According to one embodiment, a fan module is disclosed that includes a frame and a fan configured to rotate about an axis of the frame. The fan has a hub with a plurality of blades extending radially from the hub. The fan module further includes an electric motor configured to rotate the fan about the axis. The electric motor includes a bearing holder connected at a first bearing holder end to the frame and extending into the hub at a second bearing holder end. The bearing holder has a first section with a first diameter that is smaller than diameters of the first bearing holder end and the second bearing holder end. The motor further includes a first bearing retained by the bearing holder at the first bearing holder end, and a second bearing retained by the bearing holder at the second bearing holder end. The motor further includes a shaft retained by the first bearing and the second bearing, and a stator surrounding the first section of the bearing holder.

Aspects of the embodiment include the bearing holder formed of a first piece removably coupled to a second piece. Aspects of the embodiment also include the first piece being the first bearing holder end, and the second piece being the first section and the second bearing holder end. Aspects of the embodiment also include the first section being removably coupled to the second bearing holder end within the second piece of the bearing holder. Aspects of the embodiment also include a printed circuit board coupled to at least one of the frame or the bearing holder. Aspects of the embodiment also include the printed circuit board being configured to control the motor and having a radial dimension that is smaller than a diameter of the hub. Aspects of the embodiment also include a diameter of the fan being at least about 2.6 times larger than a diameter of the hub. Aspects of the embodiment also include the diameter of the hub being about 15 mm. Aspects of the embodiment also include the diameter of the fan being about 40 mm. Aspects of the embodiment also include the shaft being retained by the first bearing at a first shaft end and retained by the second bearing at a second shaft end. Aspects of the embodiment also include the diameters of the first bearing holder end and the second bearing holder end being the same. Aspects of the embodiment also include the diameters of the first bearing holder end and the second bearing holder end being different. Aspects of the embodiment also include an inner diameter of the stator being smaller than outer diameters of the first bearing and the second bearing.

According to another embodiment, a fan motor is disclosed. The fan motor includes a bearing holder having a first bearing holder end and a second bearing holder end. The bearing holder has a first section with a first diameter that is smaller than diameters of the first bearing holder end and the second bearing holder end. The motor further includes a first bearing retained by the bearing holder at the first bearing holder end, and a second bearing retained by the bearing holder at the second bearing holder end. The motor further includes a shaft retained by the first bearing and the second bearing, and a stator surrounding the first section of the bearing holder.

Aspects of the embodiment include the bearing holder being formed of a first piece removably coupled to a second piece. Aspects of the embodiment also include the first piece being having the first bearing holder end, and the second piece having the first section and the second bearing holder end. Aspects of the embodiment also include the first section being removably coupled to the second bearing holder end within the second piece of the bearing holder. Aspects of the embodiment also include a printed circuit board coupled to at least one of the frame or the bearing holder. The printed circuit board is configured to control the motor and has a radial dimension that is smaller than a diameter of the hub. Aspects of the embodiment also include the shaft being retained by the first bearing at a first shaft end and retained by the second bearing at a second shaft end. Aspects of the embodiment also include an inner diameter of the stator being smaller than outer diameters of the first bearing and the second bearing.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure, and its advantages and drawings, will be better understood from the following description of embodiments together with reference to the accompanying drawings. These drawings depict only embodiments and are, therefore, not to be considered as limitations on the scope of the various embodiments or claims.

DETAILED DESCRIPTION

Figure 1:
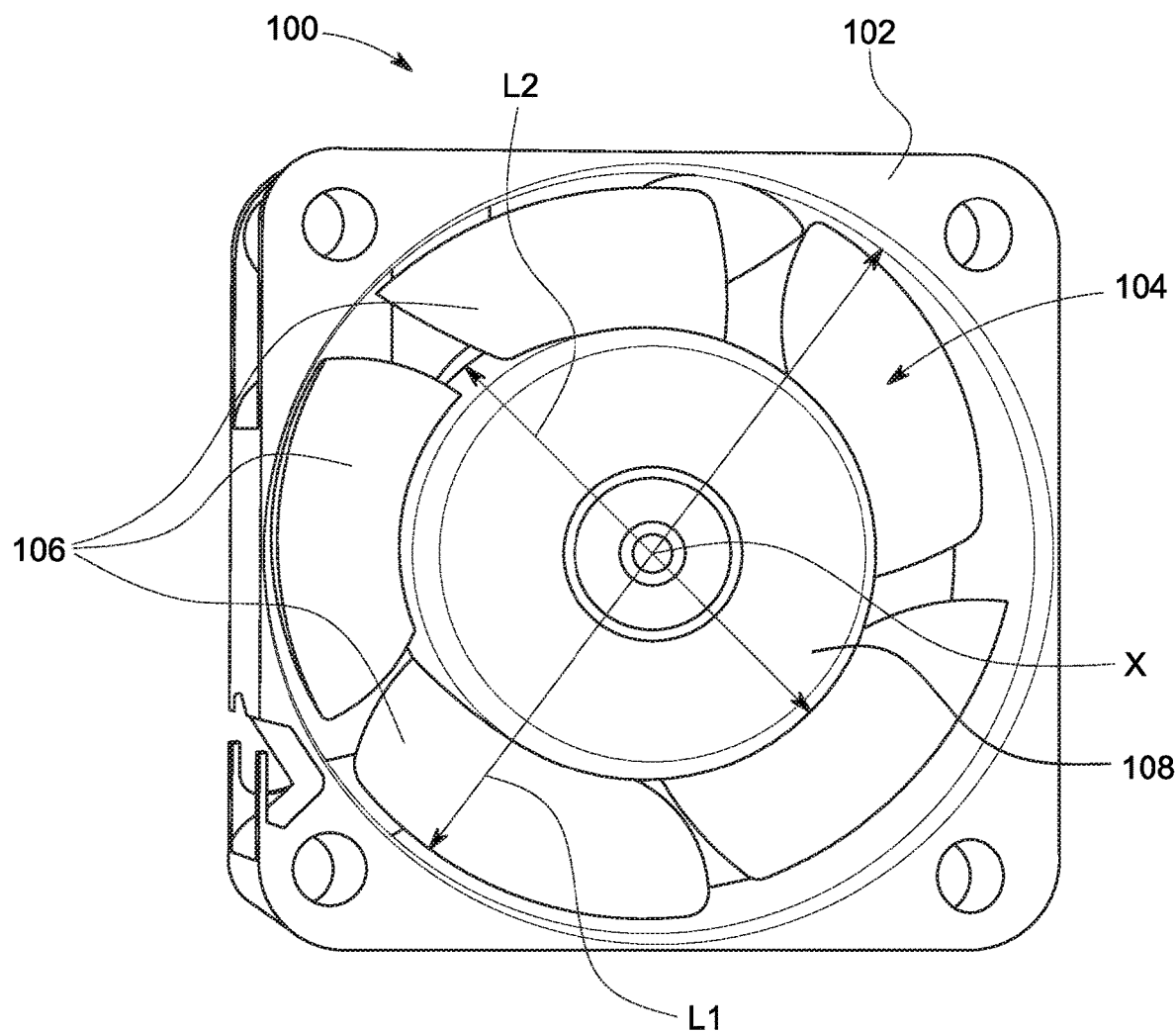
FIG. 1 is a perspective view depicting a conventional fan module.

The various embodiments are described with reference to the attached figures, where like reference numerals are used throughout the figures to designate similar or equivalent elements. The figures are not drawn to scale, and they are provided merely to illustrate the instant invention. It should be understood that numerous specific details, relationships, and methods are set forth to provide a full understanding. One having ordinary skill in the relevant art, however, will readily recognize that the various embodiments can be practiced without one or more of the specific details, or with other methods. In other instances, well-known structures or operations are not shown in detail to avoid obscuring certain aspects of the various embodiments. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

With regards to the present disclosure, the terms "computing device" or "computing system" or "computer system" or "computer" refer to any electronically-powered or battery-powered equipment that has hardware, software, and/or firmware components, where the software and/or firmware components can be configured for operating features on the device.

Figure 2:
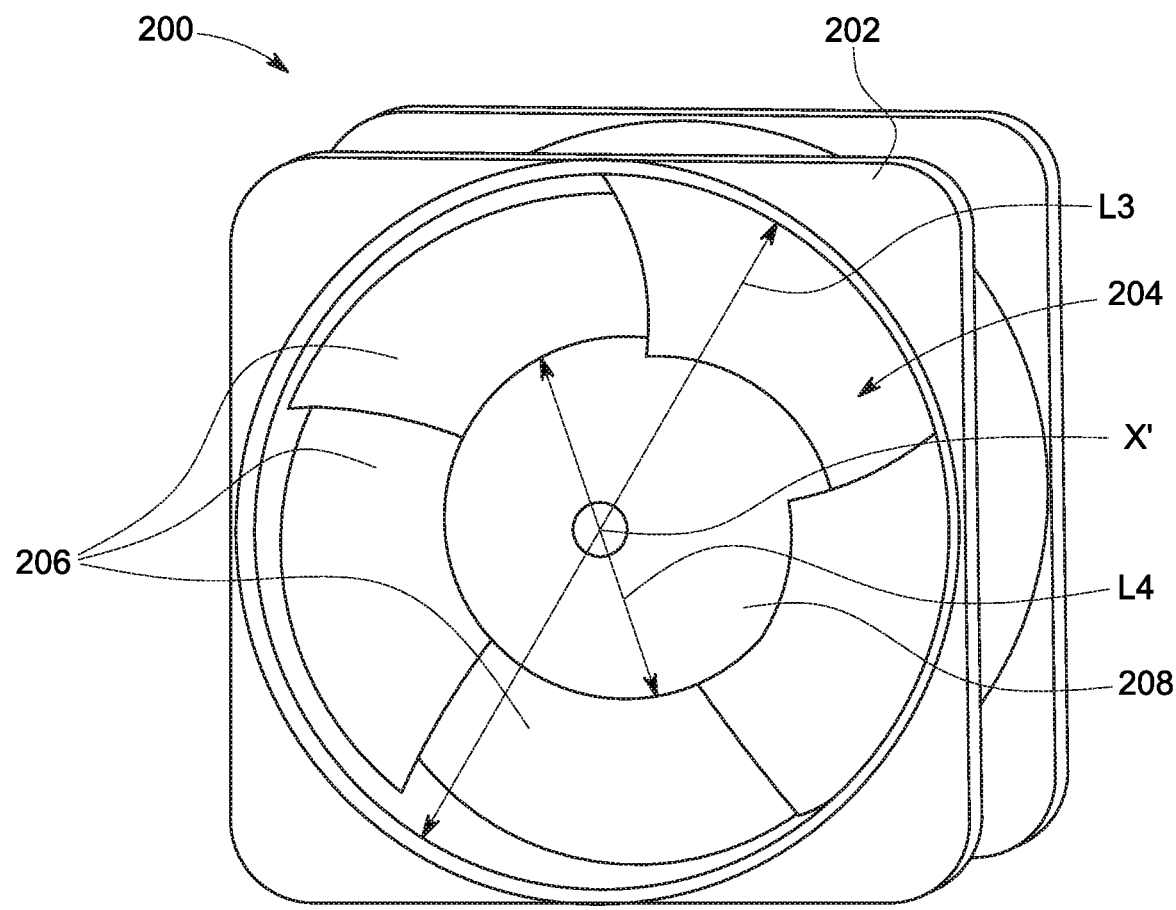
FIG. 2 is a perspective view depicting a fan module, according to aspects of the present disclosure.

FIG. 2 is a perspective view depicting a fan module 200, according to aspects of the present disclosure. The fan module 200 includes a frame 202. The frame 202 can be configured to secure the fan module 200 within a computer system (not shown). The fan module 200 further includes a fan 204. The fan 204 is configured to rotate about an axis X' of the frame 202. The fan 204 includes a plurality of blades 206 that extend radially from a hub 208. Although five blades 206 are illustrated extending from the hub 208, there can be more or less than five blades 206. Further, the configuration (size, geometry, etc.) of the plurality of blades can vary from what is illustrated. A length L3 of the fan module 200 corresponds to the diameter of the fan 204. A length L4 of the fan module 200 corresponds to the diameter of the hub 208 of the fan 204.

Unlike the conventional fan modules described above (FIG. 1), the ratio of the diameter of the hub 208 (i.e., L4) to the diameter of the fan 204 (i.e., L3) is less than 0.6. More specifically, the ratio L4/L3 can be about 0.38 or smaller. For example, the fan module 200 with a fan 204 having a diameter of 40 mm can have a hub 208 with a diameter of about 15 mm. This results in a ratio of L4/L3 of about 0.375. As a result, the fan module 200 has about a 25% increase in airflow rate by volume for similar 40 mm fans, as compared to the fan module 100. The 25% increase is significant efficiency for the same sized frame (e.g., frame 102 and frame 202 in FIG. 1).

Figure 3:
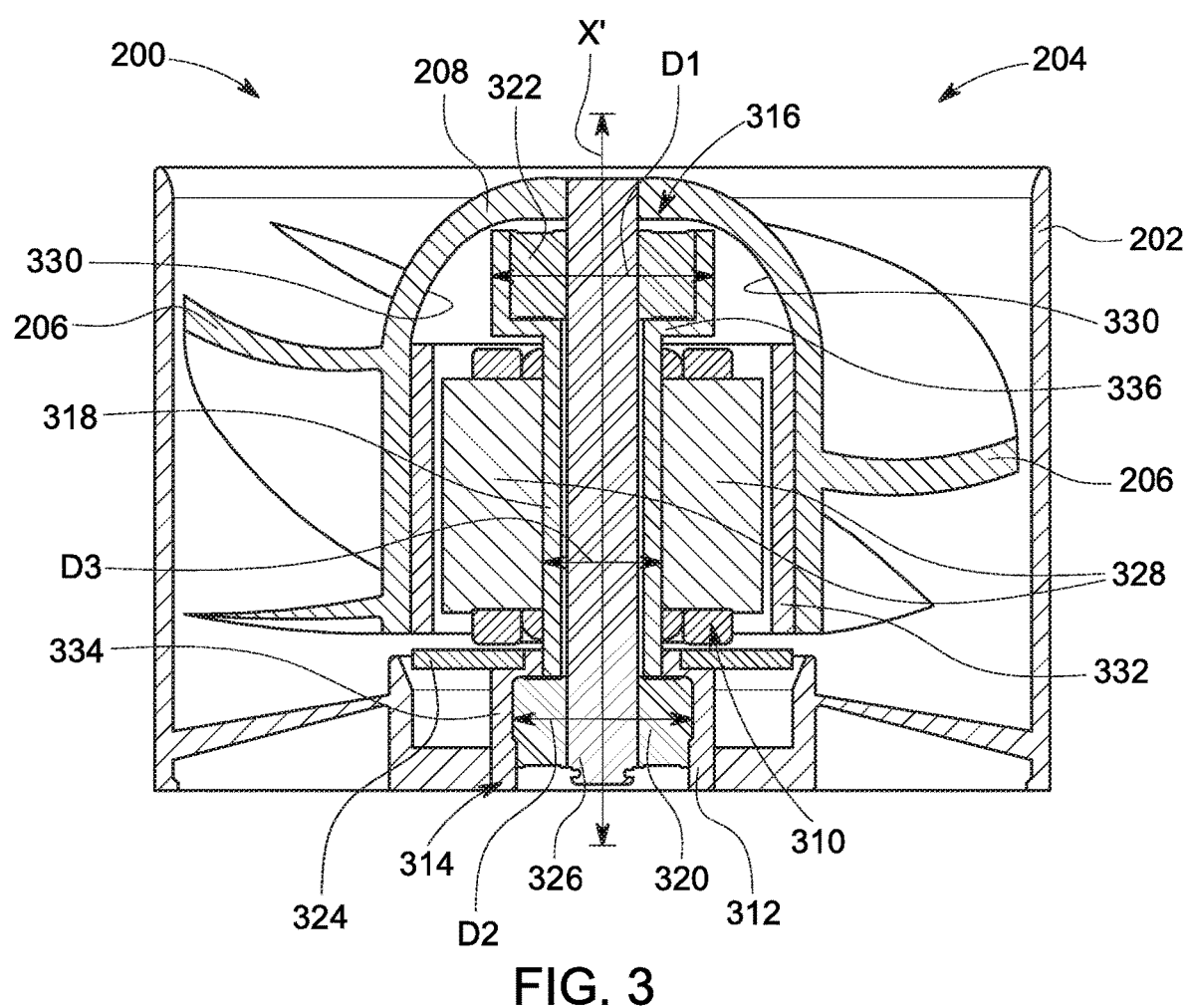
FIG. 3 is a cross-sectional view depicting a fan module, according to aspects of the present disclosure.

Referring to FIG. 3, a cross-sectional view of the fan module 200 is illustrated, according to aspects of the present disclosure. FIG. 3 includes the frame 202 and the fan 204. The fan 204 includes the plurality of blades 206 that extend radially from the hub 208. As described above, the fan 204 is configured to rotate about the axis X' of the frame 202.

Partially housed within the hub 208 is an electric motor 310 that is configured to rotate the fan 204 about the axis X' of the frame 202. The electric motor 310 includes a bearing holder 312 connected at a first bearing holder end 314 to the frame 202. The bearing holder 312 extends into the hub 208 at a second bearing holder end 316. The second bearing holder end 316 is free-standing, e.g., not directly connected to the frame 202 of the hub 208. The diameter D1 of the first bearing holder end 314 can be the same or different from the diameter D2 of the second bearing holder end 316.

The bearing holder 312 further includes a section 318 with a diameter D3. As illustrated in FIG. 3, the diameter D3 of the section 318 is less than the diameters D1 and D2 of the first bearing holder end 314 and the second bearing holder end 316, respectively.

The electric motor 310 further includes a first bearing 320 retained by the bearing holder 312 at the first bearing holder end 314, and a second bearing 322 retained by the bearing holder 312 at the second bearing holder end 316. A shaft 326 extends from the first bearing 320 to the second bearing 322 and is retained by the first bearing 320 and the second bearing 322. The shaft 326 extends longitudinally along the axis X' of the frame 202 and is configured to rotate about the axis X'.

The electric motor 310 further includes a stator 328 that surrounds at least part of the section 318 of the bearing holder 312. Because the stator 328 surrounds the section 318 and not the first bearing holder end 314 and the second bearing holder end 316, the inner diameter of the stator 328 can be smaller than the outer diameter of the first bearing 320 and the second bearing 322. On the inside surface 330 of the hub 208 are a plurality of magnets 332 that interact with the stator 328 when the electric motor 310 is powered on to cause the fan 204 to rotate about the axis X' of the frame 202.

The electric motor 310 can optionally include a printed circuit board 324 (PCB 324) that is configured to control the electric motor 310 during operation. For example, the PCB 324 can have hardware, firmware, and/or software that is configured to control the operation (e.g., such as the speed) of the fan 204 to cool a computer system (not shown) that includes the fan module 200. The PCB 324 has a radial dimension that is smaller than the diameter L4 of the hub 208 so that airflow is substantially unrestricted by the PCB 324 within the fan module 200.

Referring back to the bearing holder 312, the diameter D3 of the section 318 being less than the diameters D1 and D2 of the first bearing holder end 314 and the second bearing holder end 316, respectively, allows the overall diameter of the hub 208 to be smaller. For example, a conventional fan module (e.g., fan module 100) does not have the section 318 with the smaller diameter D3. Instead, any bearing holder in the fan module 100 is a single, constant diameter along its length. As a result of the section 318 with the smaller diameter D3, there is space savings that allows for a more compact configuration within the hub 208, which also allows the hub 208 to be smaller (e.g., smaller diameter L4). Thus, there is more area for the plurality of blades 206 within the same size frame 202, which allows the plurality of blades 206 to take up more overall area of the fan 204. For example, the diameter L3 of the fan 204 can be at least about 2.6 times larger than the diameter L4 of the hub 208. This relationship is based on the section 318 having a smaller diameter D3 than the diameters D1 and D2 of the first bearing holder end 314 and the second bearing holder end 316, respectively. Thus, where the fan 204 has a diameter L3 of about 40 mm, the diameter L4 of the hub 208 can be, for example, about 15 mm.

To allow assembly of the bearing holder 312, the bearing holder 312 includes a first piece 334 that is removably coupled to a second piece 336. The first piece 334 can include the first bearing holder end 314. The second piece 336 can include the section 318 and the second bearing holder end 316. The first piece 334 being removably coupled to the second piece 336 allows the section 318 to be inserted between the stator 328 despite the diameters D1 and D2 of the first bearing holder end 314 and the second bearing holder end 316 being too large to fit within the stator 328. In one or more embodiments, the section 318 can further be removably coupled to the second bearing holder end 316; in which case, the second piece 336 can be separated into the section 318 separate from the second bearing holder end 316.

Figure 4:
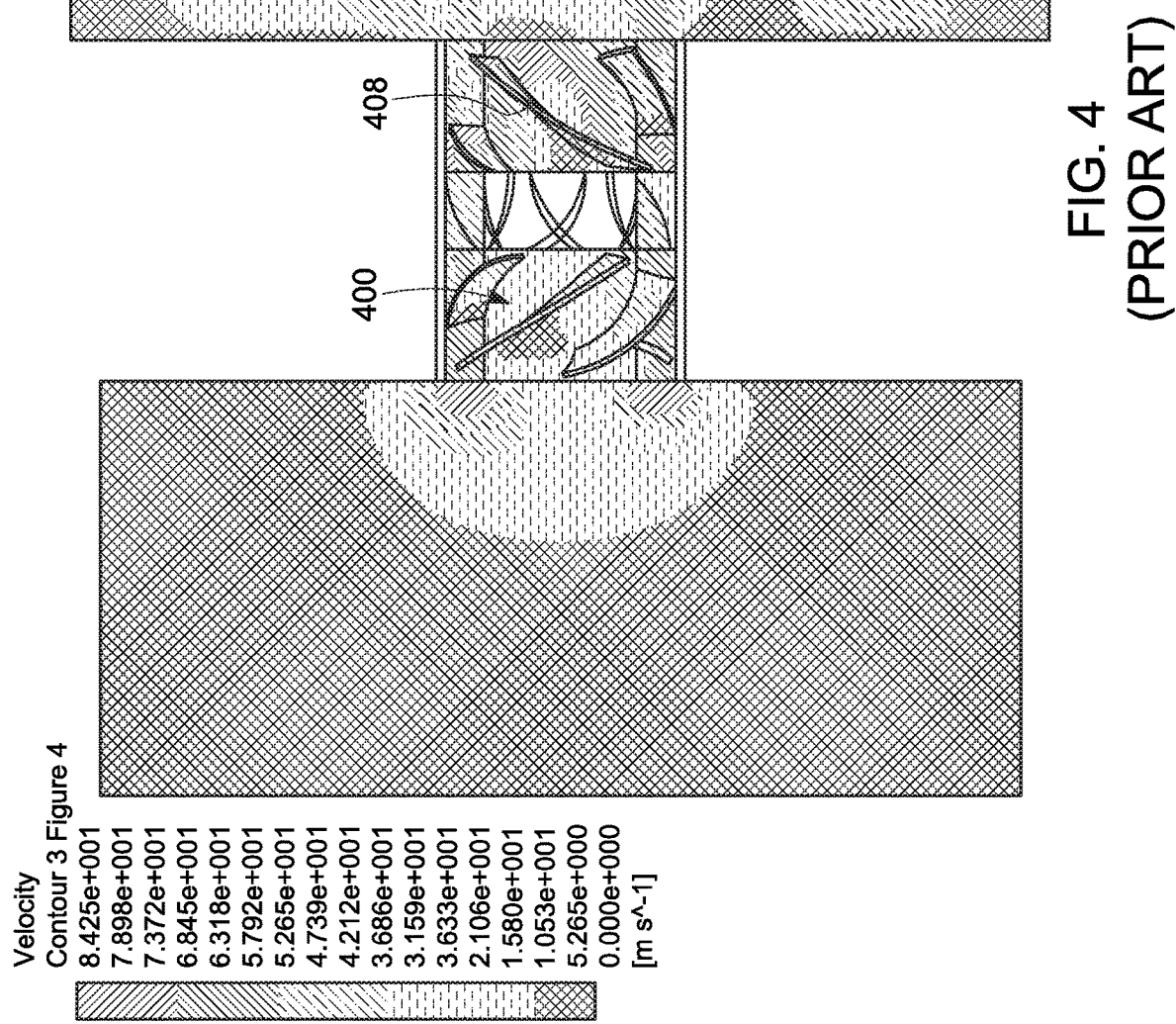
FIG. 4 is a semi-transparent side view depicting the airflow through a conventional fan module.
Figure 5:
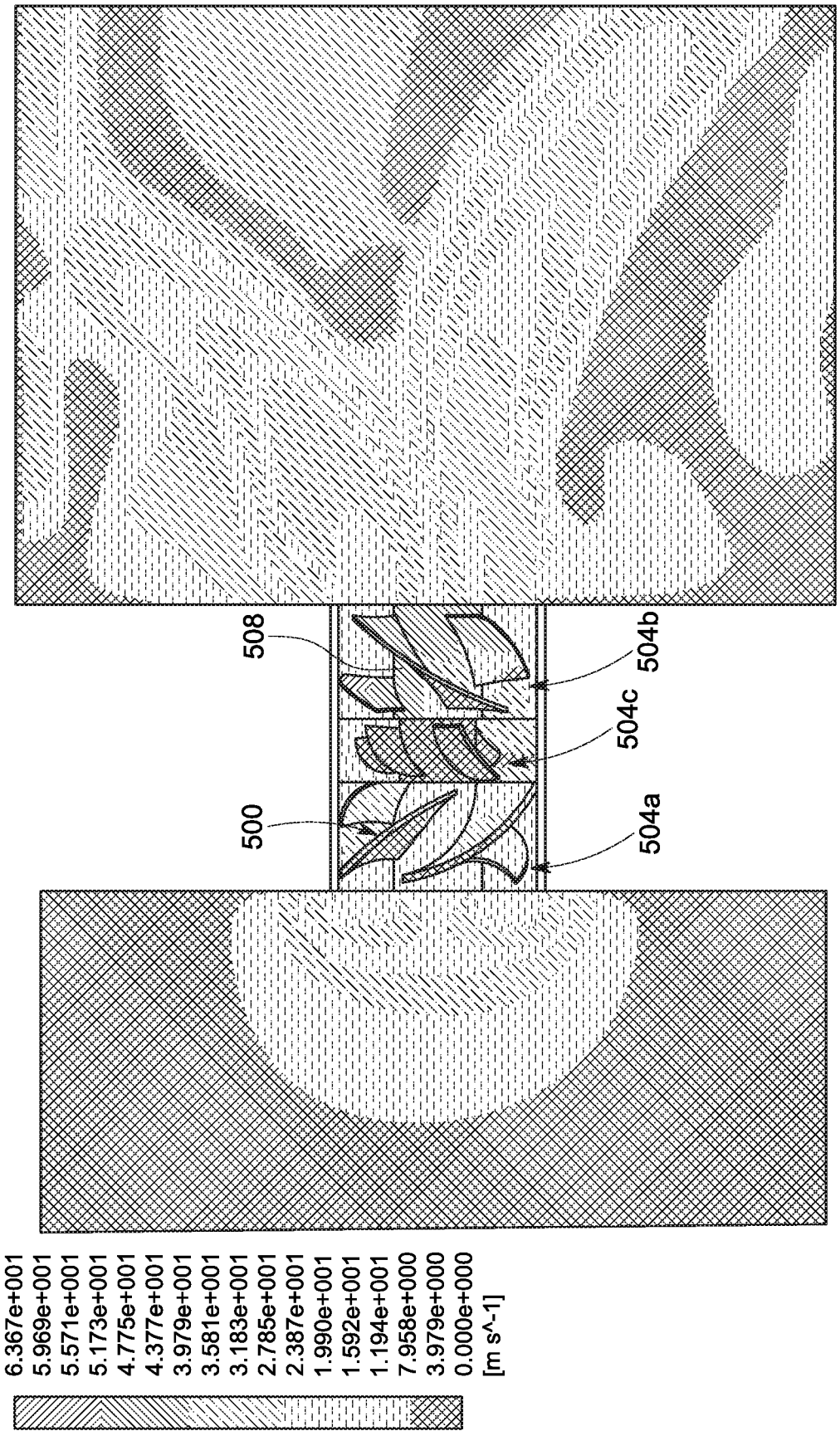
FIG. 5 is a semi-transparent side view depicting the airflow through a fan module, according to aspects of the present disclosure.

FIGS. 4 and 5 illustrate semi-transparent side views depicting airflow through a conventional fan module 400 (FIG. 4) and a fan module 500 according to aspects of the present disclosure (FIG. 5). The comparison between the illustration in FIG. 5 versus the illustration in FIG. 4 shows that the fan module 500, according to aspects of the present disclosure, produces higher airflow velocities than the fan module 400 for the same form factor of (e.g., a 40 mm fan module). This is because the hub 508 diameter of the fan module 500 in FIG. 5 is smaller than the hub 408 of the fan module 400 in FIG. 4, which results in more airflow through the fan module 500 than the fan module 400.

Although primarily disclosed as having a single fan and motor, in one or more implementations, fan modules according to the present disclosure can include two fans, as illustrated in FIG. 5. For example, the fan module 500 in FIG. 5 includes fans 504a and 504b. Contained within each of the fans 504a and 504b are electric motors (not shown) that power the fans 504a and 504b. Between the fans 504a and 504b can be another fan 504c that is connected to the fan 504a or 504b such that rotation of the fan 504a or 504b causes rotation of the 504c. Alternatively, the fan 504c can be a static blade. Further, although described as fans, in one or more implementations, the configuration of the bearing holder described herein can be applied to axial compressors.

While various embodiments of the present invention have been described above, it should be understood that they have been presented by way of example only, and not limitation. Numerous changes to the disclosed embodiments can be made in accordance with the disclosure herein without departing from the spirit or scope. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A fan module comprising:
   a frame;
   a fan configured to rotate about an axis of the frame, the fan having a hub with a plurality of blades extending radially from the hub; and
   an electric motor configured to rotate the fan about the axis, the electric motor comprising:
   a bearing holder connected at a first bearing holder end to the frame and extending into the hub at a second bearing holder end, the bearing holder having a first section with a first diameter that is smaller than diameters of the first bearing holder end and the second bearing holder end;
   a first bearing retained by the bearing holder at the first bearing holder end;
   a second bearing retained by the bearing holder at the second bearing holder end;
   a shaft retained by the first bearing and the second bearing; and
   a stator surrounding the first section of the bearing holder,
   wherein a diameter of the fan is at least about 2.6 times larger than a diameter of the hub.

2. The fan module of claim 1, wherein the bearing holder comprises a first piece removably coupled to a second piece.

3. The fan module of claim 2, wherein the first piece includes the first bearing holder end, and the second piece includes the first section and the second bearing holder end.

4. The fan module of claim 3, wherein the first section is removably coupled to the second bearing holder end within the second piece of the bearing holder.

5. The fan module of claim 1, further comprising a printed circuit board coupled to at least one of the frame or the bearing holder.

6. The fan module of claim 5, wherein the printed circuit board is configured to control the motor and has a radial dimension that is smaller than a diameter of the hub.

7. The fan module of claim 1, wherein the diameter of the hub is about 15 mm and the diameter of the fan is about 40 mm.

8. The fan module of claim 1, wherein the shaft is retained by the first bearing at a first shaft end and retained by the second bearing at a second shaft end.

9. The fan module of claim 1, wherein the diameters of the first bearing holder end and the second bearing holder end are the same.

10. The fan module of claim 1, wherein the diameters of the first bearing holder end and the second bearing holder end are different.

11. The fan module of claim 1, wherein an inner diameter of the stator is smaller than outer diameters of the first bearing and the second bearing.

\* \* \* \* \*